United States Patent [19]

Matheny

[11] 4,032,724

[45] June 28, 1977

[54] DIRECT STATION SELECTION CIRCUIT

[75] Inventor: Coy Edwin Matheny, Fulton, Ky.

[73] Assignee: International Telephone and Telegraph Corporation, New York, N.Y.

[22] Filed: Aug. 11, 1975

[21] Appl. No.: 603,327

[52] U.S. Cl. .............................. 179/99; 179/18 AD
[51] Int. Cl.² .......................................... H04M 1/72
[58] Field of Search .......... 179/1 H, 18 AD, 18 BB, 179/99

[56] References Cited

UNITED STATES PATENTS

| 3,210,475 | 10/1965 | Breen et al. | 179/18 BB |
|---|---|---|---|
| 3,299,217 | 1/1967 | Burns | 179/99 |
| 3,725,601 | 4/1973 | Jetzt et al. | 179/99 |
| 3,819,871 | 6/1974 | Verdon | 179/99 |
| 3,872,261 | 3/1975 | Shinoi et al. | 179/99 |
| 3,904,834 | 9/1975 | Shinoi et al. | 179/99 |
| 3,931,477 | 1/1976 | Warman | 179/18 AD |

Primary Examiner—Kathleen H. Claffy
Assistant Examiner—Randall P. Myers
Attorney, Agent, or Firm—J. B. Raden; M. M. Chaban

[57] ABSTRACT

Within a key telephone system, there is provided a circuit for completing a direct signalling path from a first station to another station in the system. By depressing a button at the first station designated with identifying indicia of the other station, a direct speaking connection is made from the first station to the other station. The first station may be an attendant's position with direct key appearance for each station to which the attendant is to have direct access. In a preferred form, the called station has a loudspeaker associated with the station instrument. In this instance, a direct call results in a signalling tone directed to the loudspeaker, following which the attendant can converse with the speaker-equipped station. With an attendant's position, depression of a direct station key automatically places a line to which the attendant had been connected on hold.

5 Claims, 2 Drawing Figures

DIRECT STATION SELECTION CIRCUIT

BACKGROUND OF THE INVENTION

In telephone key systems, there frequently arises the need for an attendant to converse with a specific station in the system. It is, of course, well-known to provide a jack for each station of the system and allow an operator to plug into such jack to access said station. Other systems provide means for automatically dialing an intercom connection from a station such as an attendant's position to a specific station after depression of an intercom button at the calling station.

SUMMARY OF THE INVENTION

The present device provides an apparatus for one station location to have direct signalling and conversation access to another station. By signalling the called station, any call in process at the one station is automatically placed on hold. The apparatus automatically resets when the automatic hold release button (optional) is depressed or by flashing the hook switch once.

When used with a loudspeaker at the called station, a conversation path is completed from the calling station to the speaker and an optional tone signal may be delivered to the speaker. The calling station may then converse with the called station using the speaker as long as button is depressed. By using the present apparatus, the calling station may complete a conversation path even when the called station is busy.

When the station having the direct station access capability cuts in on an existing conversation by directly accessing one station in the conversation, the line of the other station involved in the conversation is placed on hold and removed from the conversation path.

It is therefore an object of the invention to provide in a key telephone system an improved direct signalling access from one station to one or more other individual stations in the system.

It is a further object of the invention to provide a feature which may be added to an existing key telephone system to allow one station direct access and a conversation path to a selected called station in a manner which allows completion of a conversation path to a station, regardless of whether the called station is busy or idle.

It is a still further object of the invention to provide an apparatus for automatically placing an operative key telephone line on hold by depressing a direct selection key at a station equipped for direct station access.

DETAILED DESCRIPTION

Figure 1:
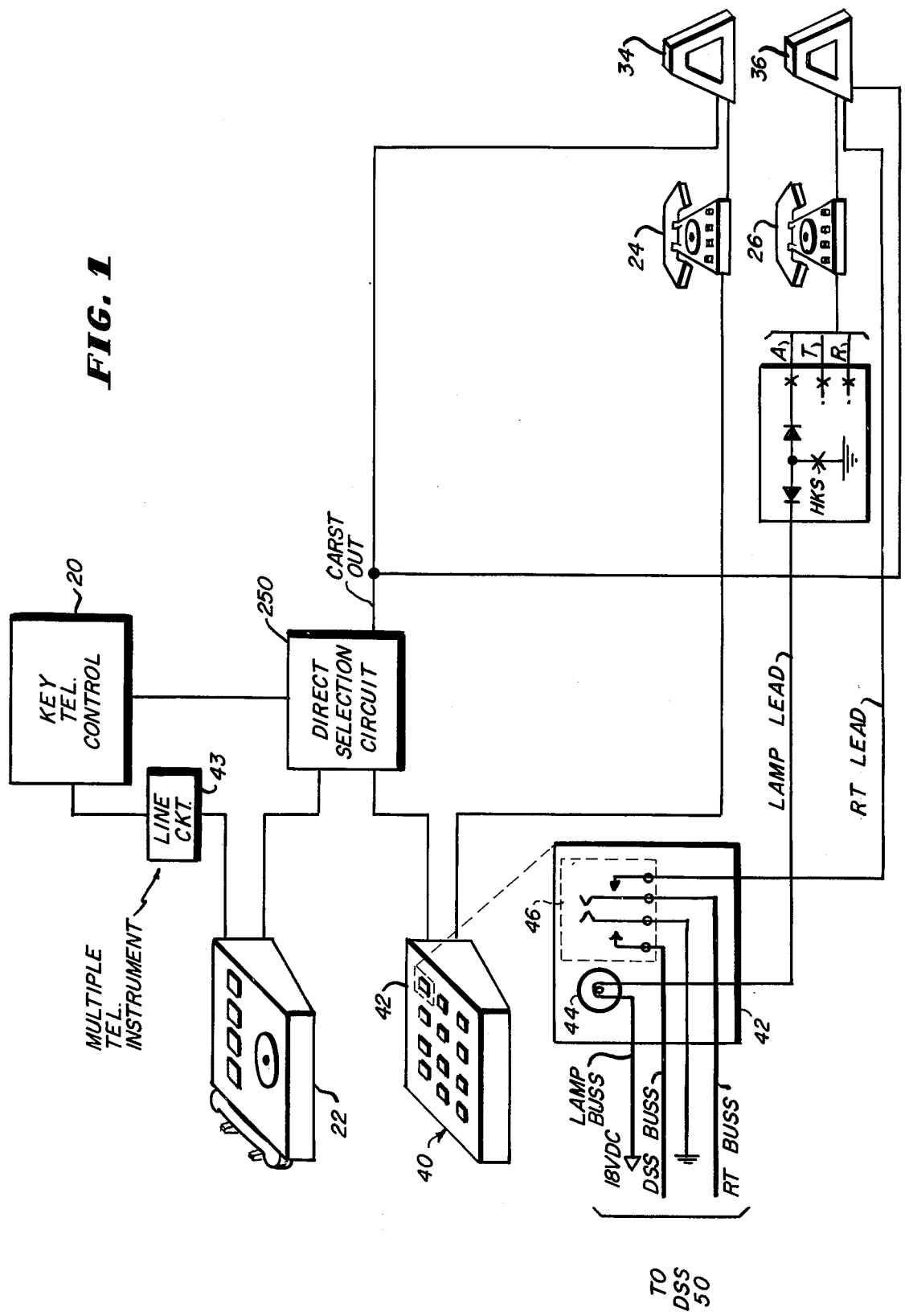
FIG. 1 is a schematic block diagram of a direct station selection apparatus within a key telephone system.

In FIG. 1, I show the elements necessary to provide my direct station selection feature within a conventional key telephone system of any type which is well-known in the art.

Such systems have a group of circuits including a control unit which has a source of interrupted pulses at a voltage suitable for lamp illumination. The system comprising the known group of circuits is represented by the box labeled key telephone control 20. Control 20 may also provide a source of other voltages for use in the key system. Each such key system has a plurality of multiple line stations, illustrated as 22, 24 and 26. Station instrument 22, as shown, is of larger capacity in lines than stations 24 and 26 but otherwise performs the same function. Preferably station 22 has a loudspeaking or hands free capability. Stations 24 and 26 are each equipped with a loudspeaker 34 and 36 respectively associated with the station instrument.

Associated with station 22 and located physically proximate to that station is a direct selection console 40 which has a conventional station lamp field using combination pushbutton lamps. Each lamp button represents and is directly connected to a respective one of the stations through an individual apparatus 42 such as that shown for station appearance 26 on console 40.

The apparatus 42 comprises a station lamp 44 and button contact assembly 46, shown as independent of one another but in actuality being commonly connected such that depression of the lamp housing actuates the button and its contacts in a known fashion.

Buss leads extend from the station appearance apparatus to a direct selection circuit 50, as will be explained in detail relative to FIG. 2, a detailed showing of circuit 50.

From the station appearance, two leads, an RT lead and a lamp lead connector couple the station 26 to the appearance via a distributing frame or intermediate terminal assembly, not shown. The RT lead is directed to the loudspeaker 36 at the station 26 while the lamp lead passes through diodes and a hookswitch at the station instrument in a known manner.

By the use of the apparatus of FIG. 1, a user at Station 22 (the user or attendant) may directly call any station by depressing its button on DSS console 40. This action automatically removes ground from the A lead to the attendant's telephone instrument and causes the busy line circuit 43 to place on a hold any call in process to the attendant. In the usual circumstance, the attendant at station 22 will have been in conversation over a line, and will have depressed a direct station button with the conversing line having been placed on hold. This removal of the A lead and its effect on a key system line circuit to place the line on hold is well-known in the art. The direct selection circuit 50 may optionally emit an audible tone signal to the loudspeaker at the direct signalled station, assumed to be station 26. The attendant may then speak to the signalled station regardless of whether the station is busy or not. If the called station is equipped with two-way capability, the called station may converse with the attendant station. The path to the signalled station 26 is released whenever the attendant releases the direct station selection button. Release of the DSS circuit of FIG. 2 may also be implemented, by depressing another line key on the attendant's station instrument or by depressing another station button on the console. In the latter event, the circuit 50 of FIG. 2 re-operates for direct conversation with the selected station.

Figure 2:
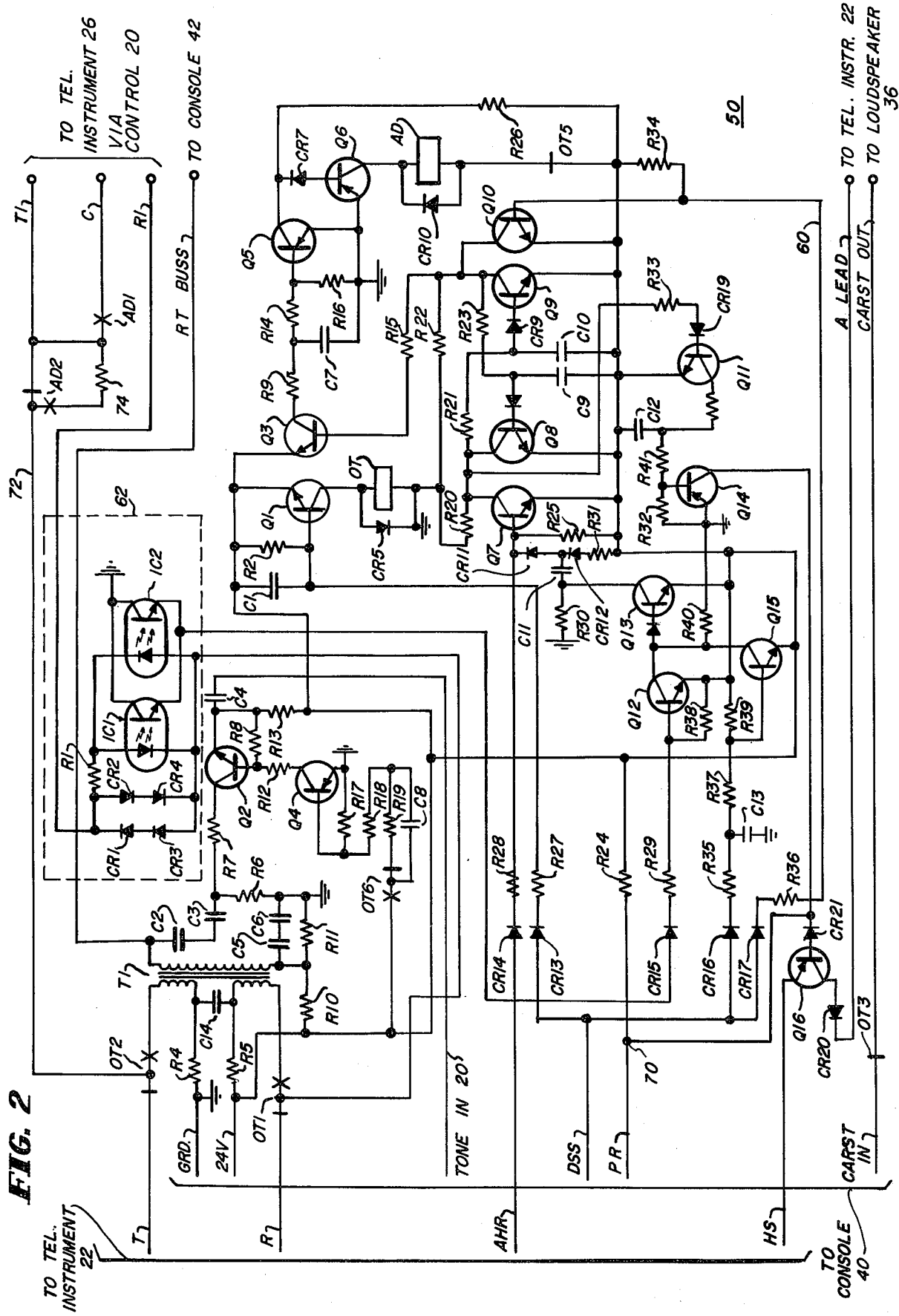
FIG. 2 is a schematic circuit diagram of the control circuit of FIG. 1.

In FIG. 2, I show a schematic of the control of the DSS console, in the form of Direct Station Selection Circuit (DSS) 50. In the quiescent state of the circuit, the condition of the latch comprised of transistors Q8 and Q9 is such that transistor Q8 is on and Q9 is off. When ground is connected to the DSS control buss responsive to depression of a station selection button, the ground may be traced on lead 60 to the base of transistor Q10. Transistor Q10 conducts cutting off Q8 and causing Q9 to conduct to change the state of the latch. Approximately 25 msec. after ground is connected to the DSS control buss, capacitor C1 charges and the OT relay is energized.

Also, when the latch changes state, transistor Q3 turns off and capacitor C7 starts discharging through the E-B junction of transistor Q5. After approximately 50 msec. the collector current of transistor Q5 is insufficient to keep transistor Q6 cut off. Transistor Q6 turns on which connects a ground to one side of the AD relay.

The DC current flowing into the network of the attendant's telephone set also flows through a line current sensing circuit 62 comprised of optical couplers IC1 and IC2. When line current flows, the output of the sensing circuit is a path for DC to ground and, when line current ceases, the DC current path to ground is removed. When line current flows, the ground is connected to the base circuit of transistor Q12, turning it on. This applies -24 VDC to its collector circuit. Also connected in parallel with the collector circuit of transistor Q12 is the collector circuit of transistor Q15. Transistor Q15 also is turned on by a ground from the DSS control buss and remains on for approximately 60 msec. after the ground is removed due to the charging of capacitor C13 through the E-B junction of transistor Q15.

When the OT relay operates, it switches the current applied to the user's network from the Central Office or PABX central power to the key system power through the internal circuit of FIG. 2, over switched contacts OT1, OT2 and OT6. This line current path is transformer coupled to the individual RT buss of the DSS console and directed to the selected station via the contacts of the depressed button. When energized, the OT relay also removes the short circuit from across capacitor C8 and connects it to -24 VDC. This bias turns on transistor Q4, which supplies ground to the base resistor of transistor Q2. Transistor Q2 saturates, switching the optional tone input at its emitter to its collector circuit and to the RT buss to the selected station. Such tone input is fed to the speaker of the directly selected station to signal that station that it has been directly accessed by the attendant station. The attendant may then converse with the directly selected station using a voice path through the selected station speaker.

Another set of OT relay contacts OT5 removes the -24 VDC from one side of the AD relay coil. This open circuit condition disables the AD relay circuit for as long as the OT relay remains energized.

As mentioned previously, depression of a selected station button breaks the connection between A lead buss and hookswitch to place any line in communication with the attendant on hold. This disruption of the attendant-to-line path is accomplished in the attendants' instrument consequent to opening of the A lead, as is well-known. Continuity is normally maintained between the HS and DSS leads in the DSS console until a button on the DSS console is depressed to cause the Q8–Q9 latch to change state. Change of state of the latch turns on transistor Q11 which turns on transistor Q14. Transistor Q14 connects ground to the junction 70 of resistor R24 and diode CR21 cutting off transistor Q16. With transistor Q16 non-conductive, the continuity between A lead buss and hookswitch from the user's telephone set is broken. With line current still flowing and the A lead open, the line circuit being used is placed in the hold position.

After the conversation has been completed between the attendant and the selected station, the attendant may release the direct selection path in one of a number of ways. In one release method, the pushbutton on the DSS console is manually released and ground is removed from the console buss by this action. The following events occur as a result. The OT relay deenergizes and closes its OT5 contacts to relay AD to energize the AD relay. When the AD relay is energized, contacts AD1 and AD2 short out the network of the attendant's telephone set on lead 72 and connects a 120 ohm-resistor 74 in series with the shorted network to simulate a normal telephone connection. The discharge of capacitor C13 had kept transistor Q15 turned on for approximately 50 msec. after the control buss ground was removed to keep from triggering reset circuitry during the removal and recurrence of line current which occurs as the OT relay changes state. After capacitor C13 has charged and transistor Q15 has been cut off, the line current (absence or presence) will control the reset circuitry. On deenergization of the OT relay, contacts OT3 close to complete an obvious path between loudspeaker 36 and the exchange over leads CARST IN and OUT reenabling the loudspeaker to receive calls other than DSS calls.

When the line current is interrupted and reinstated, the following events will occur: Transistor Q12 will cut off and transistor Q13 will turn on discharging capacitor C11 via diode CR12 and resistor R31. When line current occurs again, transistor Q12 will turn on, transistor Q13 will turn off and capacitor C11 will charge via a path through resistor R30, diode CR11, and the parallel combination of the E-B junction of transistor Q7 and resistor R25. Transistor Q7 will be turned on which will turn off transistor Q9, changing the state of the latch Q8–Q9.

When the latch changes state, the AD relay will be deenergized and continuity will be re-established between the A lead buss and hookswitch.

The latch circuit of transistor Q8 and Q9 can in one form be manually reset by a grounding button connected to the A.H.R. (automatic hold release) lead. This manual reset will place ground on the AHR lead to turn on transistor Q7 and reset the Q8–Q9 latch to its normal state.

A system as described herein can be installed as a companion to any key telephone set in a system where one or more station sets are equipped with audio amplifiers on the intercom signal lead capable of receiving voice communication (350 Hz to 4000 Hz).

As mentioned previously, when the selected station pushbutton on the console is depressed, the circuit of FIG. 2 electronically places the active line circuit of the attendant's on hold. Unless a release button is depressed, the attendant is kept from going back across that line when the selected pushbutton is released. The pick-up key for that line on the attendant instrument remains depressed unless the attendant changes lines by depressing another pick-up key. That line may be reseized by depressing the attendant's AHR (automatic hold release) button. The attendant telephone instrument function is free to function as a normal key telephone set, except for the line which had previously been placed on hold. The only modification to the telephone set is one of routing the necessary connections out.

I claim:

1. A direct station selection apparatus adapted for use in a key telephone system in which at least one station of the system is equipped with an audio receiver in addition to the speaker of the station telephone instrument, comprising a second station having means associated with said second station for directly connecting the second station to the audio receiver at the one station regardless of the condition of the one station as busy or idle, means responsive to the direct connection for initiating an audio signal for transmission to the additional audio receiver and to the station instrument of said one station, and means responsive to said connection for automatically placing on hold any telephone line in communication with said second station.

2. A direct station selection apparatus as claimed in claim 1, wherein said direct connecting means comprises manually operable switch means at said second station.

3. A direct station selection apparatus as claimed in claim 2 wherein there are a plurality of stations on said key system each equipped with an additional receiver, and a plurality of manually operable switch means at said second station, each said switch means being directly connected to an individual receiver at another said plurality of stations.

4. A direct station selection apparatus in a key telephone system to provide a direct connection between a predetermined calling station and any one of a plurality of stations, said apparatus comprising a key console at said calling station with a separate key at said console for each of said plurality of stations, an A lead path from said calling station to a further station in communication with said calling station, a control circuit associated with said console and having connection in multiple to the keys thereat, said control circuit including: means for maintaining said A lead path for the flow of current therethrough, a relay responsive to operation of a selected one of said keys for completing a battery feed path between the calling station and the one station of the operated key and for completing a talking path from the calling station to the one station, further means responsive to operation of said key for blocking the flow of current through said A lead path to thereby place a hold condition on said further station, reset means for sensing a restoration of current in the battery feed path for removing the blockage of said A lead path for current flow.

5. A direct station selection circuit as claimed in claim 4, wherein said reset means includes a bistable latch settable into a first condition on operation of said key and settable into a second condition responsive to restoration of said relay and the sequential release and restoration of said current sensing means.

* * * * *